United States Patent Office 3,111,389
Patented Nov. 19, 1963

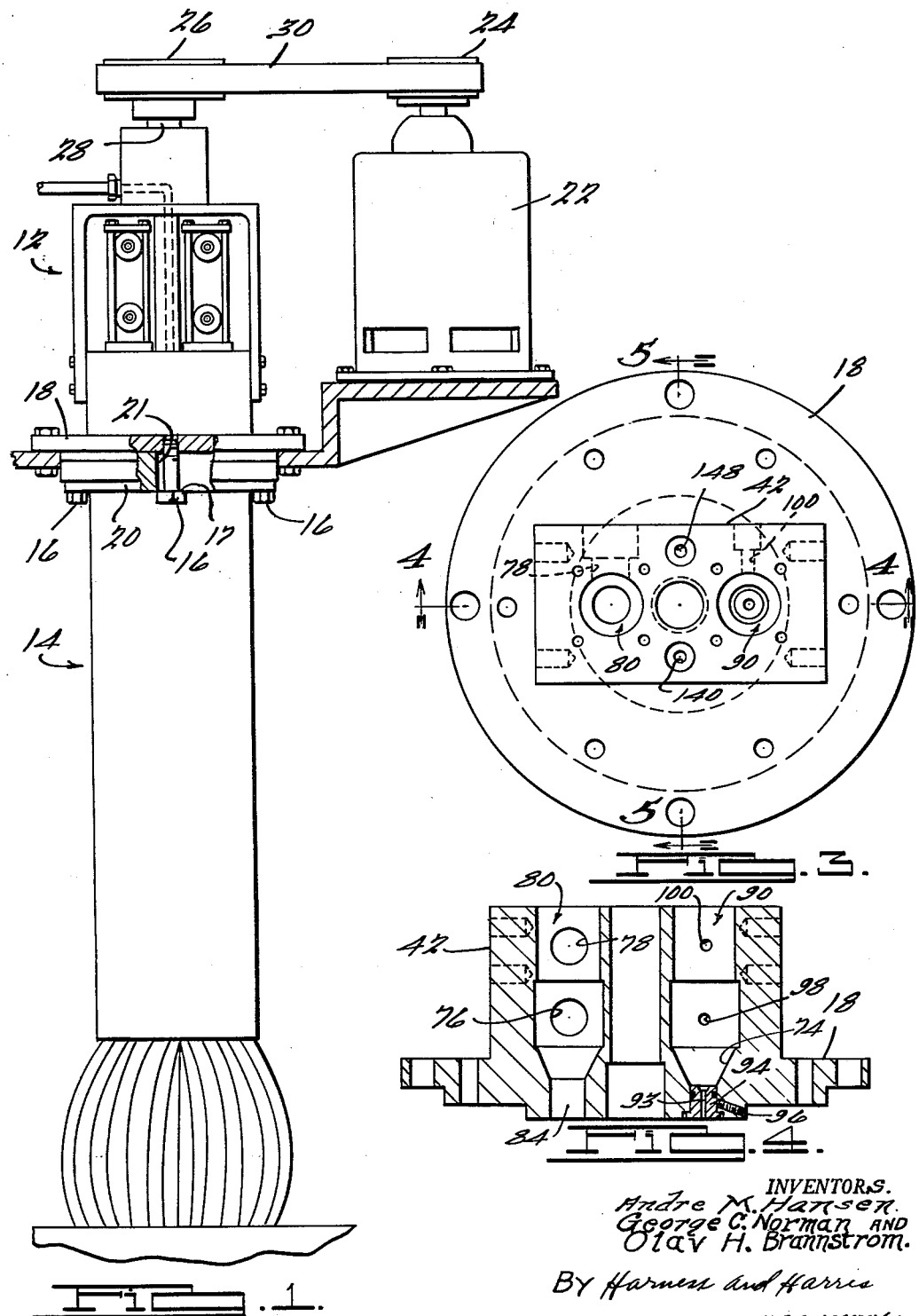

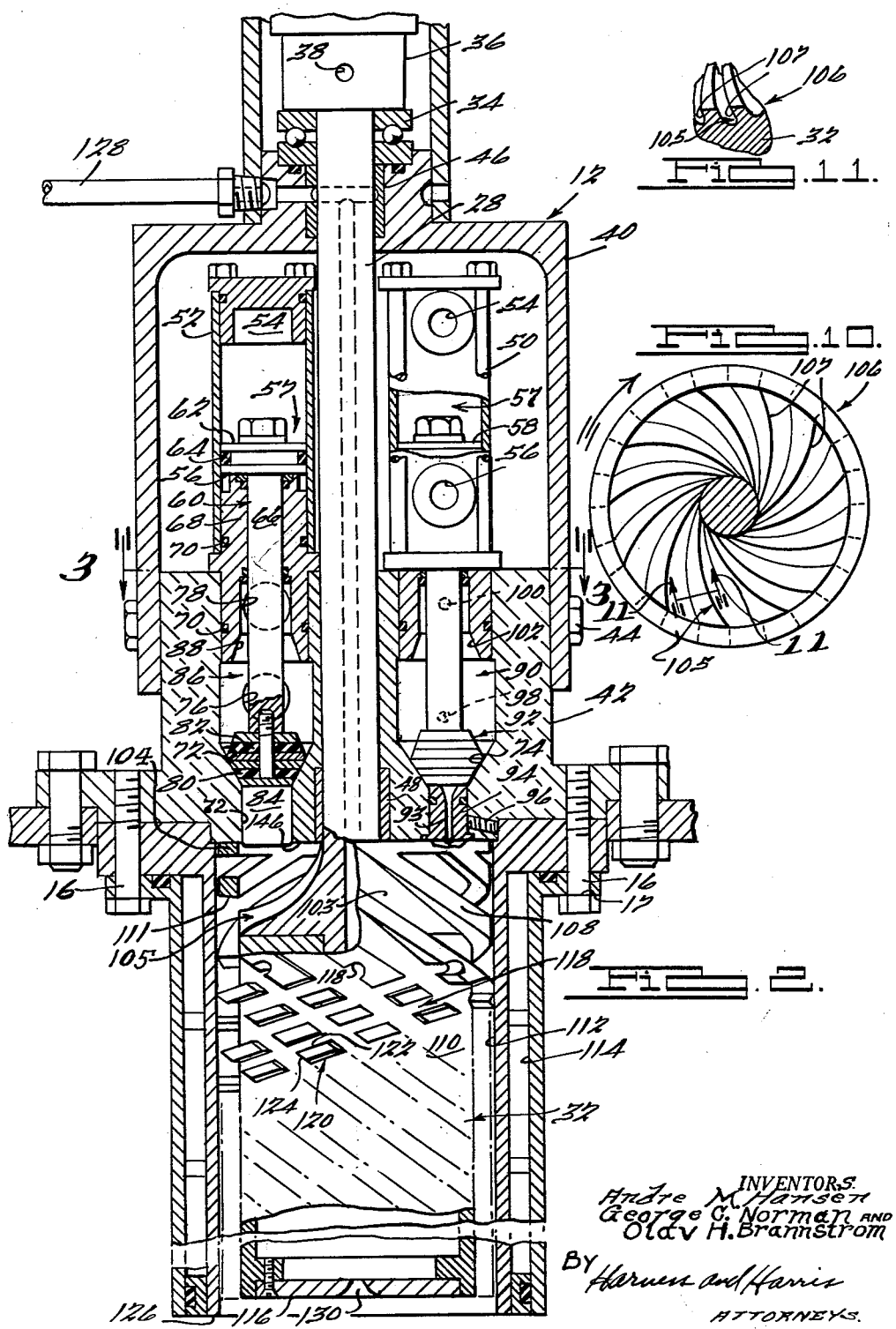

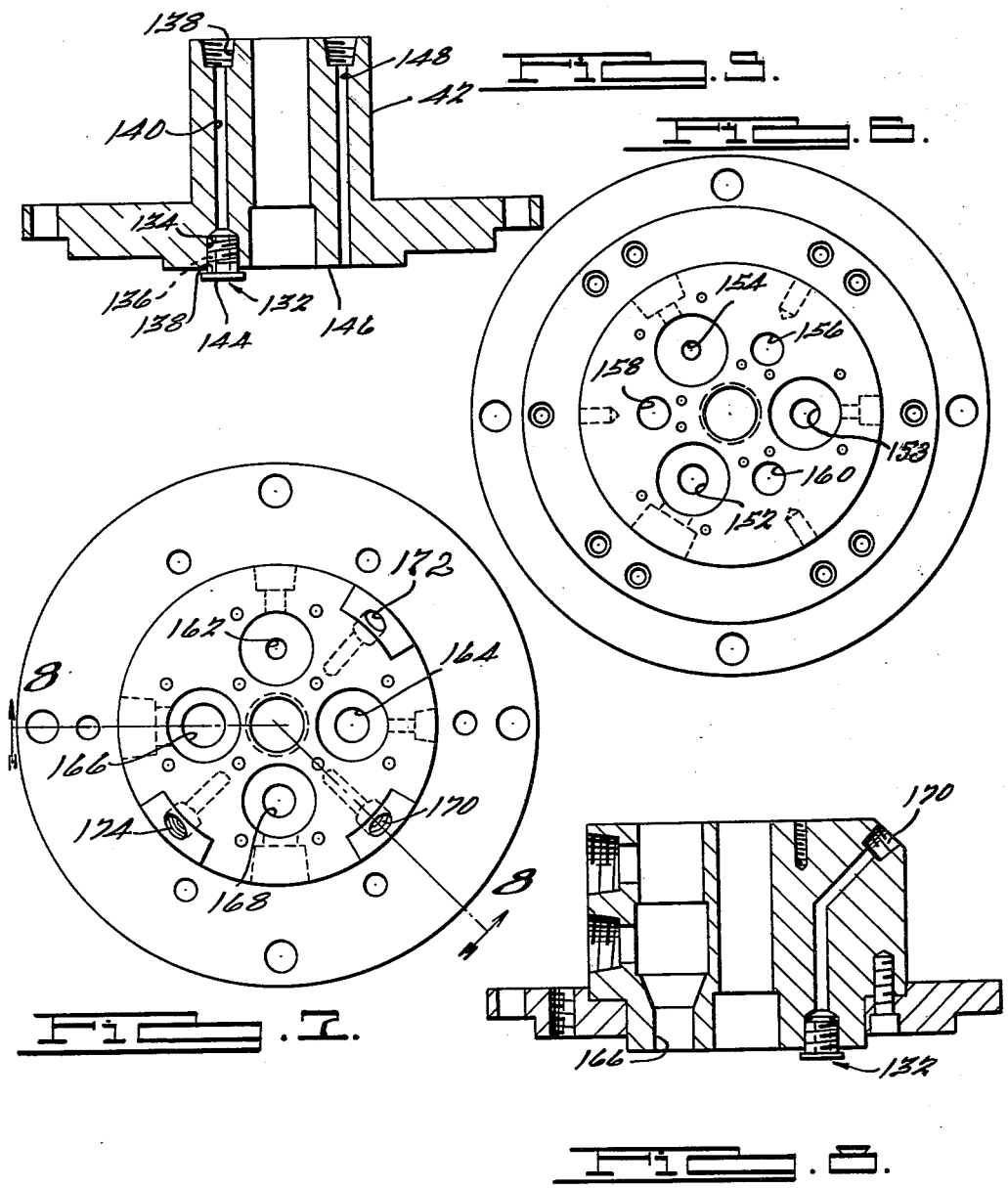

3,111,389
APPARATUS FOR PREPARING POLYURETHANE FOAM COMPOSITIONS AND THE LIKE
Andre M. Hansen, Farmington, and George C. Norman and Olav H. Bramstrom, Detroit, Mich., assignors to Chrysler Corporation, Highland Park, Mich., a corporation of Delaware
Filed Oct. 22, 1959, Ser. No. 848,095
13 Claims. (Cl. 23—252)

This invention relates to polyurethane foam producing apparatus and methods of producing foam, and in particular concerns the apparatus and methods for producing seat topper pads and other contoured type structures wherein extreme uniformity in the cellular structure of the foam type pads is required.

In the use of conventional polyurethane foam producing apparatus the foam constituents are brought together in a mixing head wherein they are intimately mixed and from which they are then projected into a suitable mold in which the polyurethane foam may subsequently rise to a full blown system or may be molded by placing a proper cover over the mold. The chemical nature of the foam and the components of the charge entering the mixer are well known to the art as evidenced by the Patents 2,764,565, 2,577,279, and 2,676,157. Applicants' charge consists of a pre-polymer of polyoxypropylene glycol ether partially reacted with toluene di-isocyanate, water, N-methyl morpholine, and triethylamine.

If a uniform and standard foam product such as a seat topper pad is to be produced on a commercial volume, it is extremely important that the valve structure of the mixing head of the foam apparatus operate practically perfectly so as to minimize any unevenness in the distribution of the foam components to the mixing head. It is also very important that the mixing operation itself be carried out with precision and uniformity.

In the conventional apparatus the mixing head traverses the mold either lengthwise or across its width to lay down streaks of foam which are caused to flow into one another by either tipping the mold or by the natural tendency of the foam material to run in the mold to make a joint between the successive streaks. It is obvious that any unevenness in the mixing operation and the distribution of the catalyst or the di-isocyanate throughout the entire resin mass will result in hard and soft spots and general unevenness in the cellular structure of the product which causes non-uniformity, and for practical applications such as in seats these products are unusable.

Applicants' invention concerns several novel features for producing a more uniform foam spray among which are a novel valving arrangement for distributing the polyurethane foam components to the mixing unit; a novel mixing unit for mixing these components together; and a novel solvent cleaning system for the mixing unit, all of which features are incorporated into a single unit which can produce products having great uniformity in their cellular structure.

It is a principal feature of this invention to provide an improved apparatus for mass producing uniform polyurethane pads or other elongated type structures.

Another object of this invention is to provide a novel valving arrangement for allocating and distributing the polyurethane foam components to the mixing head.

Another object is to provide a novel type of solvent cleaning system for the head and the mixer.

A further object is to provide a novel type of mixing rotor structure.

Further objects and advantages will become apparent from the following description and drawings, in which:

FIGURE 1 represents a plan view of applicants' mixing rotor and distribution head;

FIGURE 2 represents a longitudinal cross sectional view of the distribution head and mixing unit of FIGURE 1;

FIGURE 3 represents a transverse cross sectional view of the distribution head of FIGURE 2 taken along the line 3—3 thereof in the direction of the arrows;

FIGURE 4 represents a longitudinal cross sectional view of the distribution unit of FIGURE 3 taken along the line 4—4 thereof in the direction of the arrows;

FIGURE 5 represents a longitudinal cross sectional view of the distribution head of FIGURE 3 taken along the line 5—5 thereof in the direction of the arrows;

FIGURE 6 represents a variation in the distribution head structure;

FIGURE 7 represents a cross sectional view of another variation of the distribution head structure;

FIGURE 8 represents a longitudinal cross sectional view of the head structure of FIGURE 7 taken along the line 8—8 thereof in the direction of the arrows;

FIGURE 10 represents a top view of the mixing rotor; and

FIGURE 11 represents a cross-sectional view of the bucket means taken along the line 11—11 of FIGURE 10 in the direction of the arrows.

Figure 9:
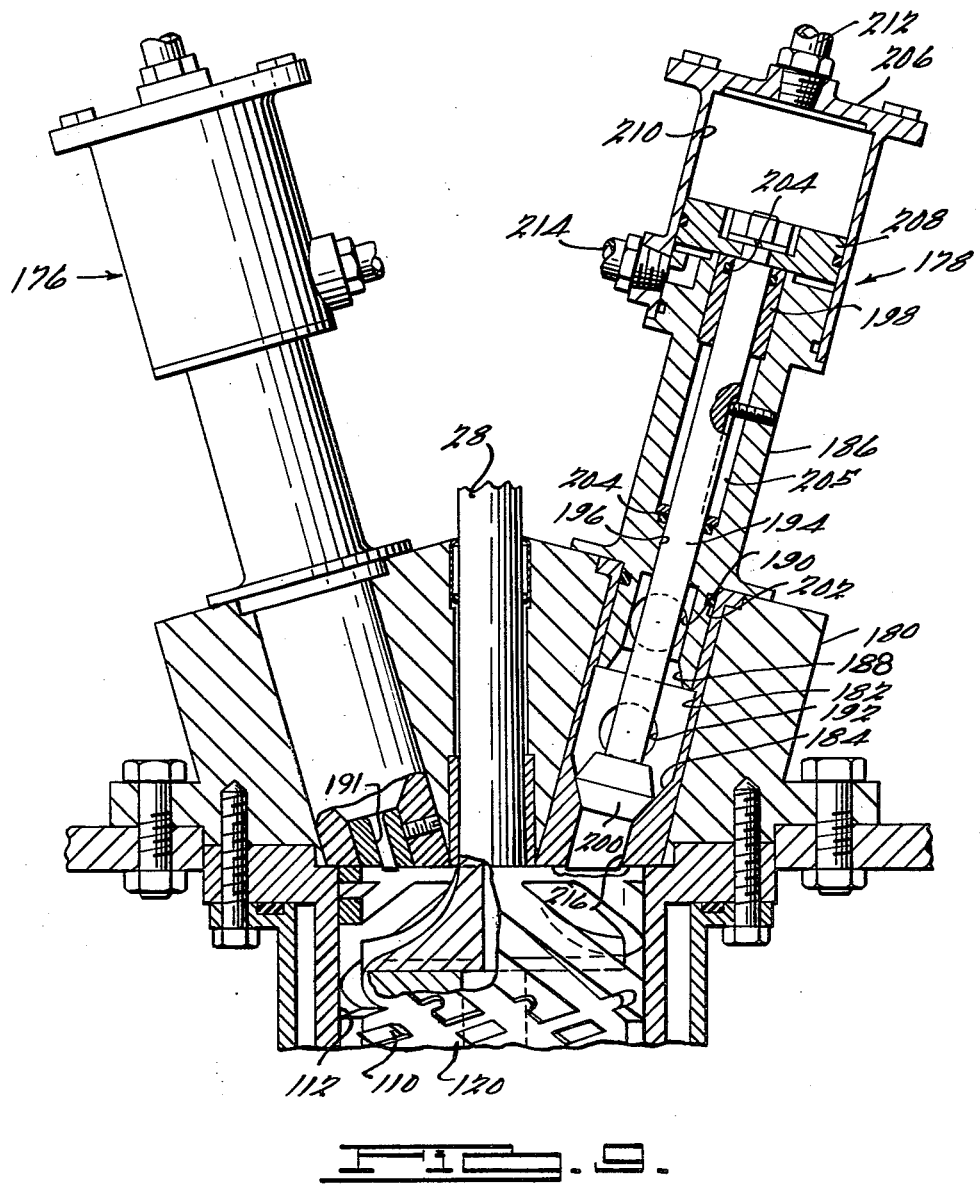
FIGURE 9 represents a longitudinal cross sectional view of the distribution head structure and a portion of the rotor structure of a variation of the distribution head.

Referring to FIGURE 1, a distribution head 12 is shown connected to a mixing unit 14 by means of bolts 16 which may be screwed directly into the plate 18 which is integral with the distribution head 12, or the plate 20 of the mixing unit 14 may have bayonet type slots 21 therein for engaging the underneath side 17 of the head of the bolts 16 when the unit 14 is rotated into an interlocking position. A motor 22 has its pulley 24 connected to a pulley 26 connected to the rotor shaft 28 of the mixing unit 14 by means of a power belt 30. This motor 22 rotates the rotating structure of the mixing unit 14 according to the desired speed and may be geared up or down by means of a pulley or gears in a conventional manner to produce any desirable speed of rotation of the mixing unit rotor member.

As shown in FIGURE 2, the rotatable member of the mixing unit 14 which is secured to the shaft 28 is a mixing rotor 32 which may be welded to the shaft 28 or secured by other means such as threads. A thrust bearing 34 which abuts the underside of a collar 36 secured by set screw means 38 to the shaft 28 supports the shaft and rotor. Head 12 may be provided with two separable sections 40 and 42 which are connected together by suitable means such as bolts 44. The shaft 28 is further mounted in the distribution unit 12 by the sleeve bearings 46 and 48. Mounted inside of housing section 40 are two double acting cylinders 50 and 52 which may be pneumatic or hydraulic. Cylinder 50 as is cylinder 52 is provided with air or hydraulic ports 54 and 56 through which the power fluid is fed and exhausted to actuate the valves 57 therein. Valves 57 consist of pistons 58 and 60 located in cylinders 50 and 52 respectively. These pistons as shown by the cross-sectional view of piston 60 consist of a head 62 provided with a piston ring 64 to prevent leakage of the hydraulic fluid and is connected to a shaft 66 mounted in a bearing sleeve and supporting structure 68 secured in lower housing section 42 of unit 12. Suitable sealing rings 70 prevent the interchange of hydraulic fluid and polyurethane foam components. It is noted that hydraulic port 56 comes in underneath the piston head 62 and hydraulic port 54 comes in over the top of piston head 62.

Provided in the bottom of housing section 42 are foam component exhaust ports 72 and 74 through which respectively flow the resin-di-isocyanate, and the catalyst systems. Feeding the resin-di-isocyanate system to port 72 is an inlet port 76, and carrying away the excess foam ingredients from port 72 is a bypass port 78. Connected to the end of shaft 66 is a resin-di-isocyanate flow control valve 80 which is provided with suitable plastic sealing rings 82 and a scavenger portion 84 preferably of Teflon which fits snugly into port 72 to clean out or scavenge any resin or foam component deposits which may occur on the walls of the port 72. It is particularly noted that valve 80 has a smaller diameter than the interior of chamber 86 into which the inlet port 76 feeds, and as the valve 80 is urged upwardly by the pressure in hydraulic port 56 it will not be able to completely shut off the inlet port 76 to cause any momentary diminishing of the flow to port 72. As the valve 80 is urged further upwardly it will eventually completely close off bypass port 78 by seating on the port seat 88. Valve 80 as shown has a tapered shape but may also be given a rounded shape on the sides so that the area of contact of the valve body with the valve port 72 will be decreased and, therefore, afford increased sealing pressure.

In the catalyst chamber means 90 is a catalyst valve 92 similar in construction to valve 80 and having a scavenger portion 93 readily insertible in a restricted orifice insert 94 which is made removable by set screw 96 from the housing 42 to allow substitutions of the catalyst orifice size to be made to vary the flow characteristics of the catalyst as desired. Scavenger portion 93 may be made removable so that other size scavenger portions can be substituted along with orifice inserts 94. The catalyst inlet port is designated 98 and is smaller in size than the resin-di-isocyanate inlet port 76 since only a very small amount of catalyst is necessary. A catalyst bypass port 100 is provided in chamber 90 as in chamber 86 and this port also has a seat 102 against which valve 92 seats as the valve is moved upwardly due to the greater pressure flowing through port 56 of the pneumatic cylinder. It is again noted that due to the relative sizes of valve 92 and chamber 90 at no time during the operation of valve 92 is the catalyst inlet port 98 cut off.

Referring to the structure of the rotor 32, it is seen that an upper ring 104 encircles a swirl portion 106 which forms the top of the rotor 32 adjacent the bottom of shaft 28. From ring 104 descends a plurality of spirals 108 which spirals are projections integral with the lower body portion 110 of the rotor located a distance below the ring 104. Body 110 is preferably a hollow cylinder for reducing the weight of the rotor 32.

Spaces 103 are formed between the spirals 108 intermediate ring 104 and section 110 of the rotor 32, through which spaces the resin-di-isocyanate, and the catalyst systems are thrown by the action of bucket means 105 of the swirl portion 106 down into the cavities formed between the spirals 108 and the inner wall 112 of a water cooled jacket 114 encircling and containing the rotor structure. The rotor 32 is spaced a predetermined distance from wall 112 depending on such factors as the viscosity and required outlet pressure of the foam charge.

Spirals 108 beginning at the ring 104 encircle the rotor section 110 and extend all the way from ring 104 to a point adjacent the bottom 116 of the rotor. The cross-section of the spirals 108 lying above body 110 shows that the bottom side 111 thereof is slanted downwardly and inwardly to provide a cam means to throw the foam ingredients outwardly against wall 112. The spirals 108 on body 110 slant upwardly in the direction of rotation of the rotor and are intersected by spiral grooves 118 extending in an opposite direction to spirals 108 around the rotor body 110 and intersecting spirals 108 to produce a plurality of projections designated 120, which projections due to the angularity of the spiraled cuts producing them are provided with leading faces 122 and 124 which when the rotor is rotated in a clockwise direction as shown in FIGURE 11 will act to spread or separate portions of the incoming foam charge and tend to spray a portion of it upwardly and a portion of it downwardly. The portion of the charge sprayed upwardly by face 122 of the projections is then struck and further mixed by the faces 124 of the projections above it and similarly a portion of the charge urged downwardly by faces 124 of each projection is struck by the faces 122 of the projections below it and are urged upwardly to further facilitate the mixing of the charge components. It is noted that the weight of the charge and the incoming pressure of the charge plus the greater downward angle and component of force exerted on the charge by the face 124 urges the major portion of the charge downwardly toward the bottom 116 of the rotor. The outer face of each projection is spaced from the inner wall 112 of the rotor housing approximately $1/100$ of an inch but may be varied depending, for example, on the viscosity of the particular charge.

It is noted that the body 110 of the rotor does not extend to the bottom edge 126 of the wall 112 but stops a distance short of it in order to contain the centrifugal swirl of the foam to produce thereby a controlled fanning of the mixed foam ingredients.

An air line 12 extends completely through the rotor shaft 28 and through the rotor body 110 and has an outlet at 130 in the bottom of the rotor body 110. As air is forced through this line 128 it will tend to break the vacuum in the vortex of the swirling charge and further fan the charge emitted at the bottom 116 of the body 110. Moreover, in further controlling the size of this fan, the air flow in line 128 may be adjusted as desired.

Referring to FIGURES 10 and 11, it is seen that the foam ingredients will be caught under the edge 107 of the feed end or swirl portion 106 of the rotor as it rotates clockwise as shown in FIGURE 10 and these ingredients will be cammed downwardly and outwardly to the bottom ends of grooves or buckets 105 and then slung outwardly between the spirals 108 against the wall 112 to be then picked up by spirals 108 and cammed downwardly among the projections 120.

Referring to FIGURE 5, a solvent baffle 132 comprising a screw having longitudinal slots 136 therein is threaded into a recess 134 in the housing portion 42 to allow solvent forced into solvent inlet 138 to flow through the solvent line 140 and impinge upon the top side 138 of the head 144 of the baffle 132. The force of the solvent striking the head 144 of the baffle will cause the solvent to spray onto the exhaust face 146 of the head 142 to clean the same whenever it is desired, such as, for example, after every two or three valving cycles. The baffle structure 132 is also shown in the variation of the distribution head structure shown in FIGURES 7 and 8 and could also be used in the structure of FIGURE 6. Another solvent line 148 is provided to allow the solvent under pressure to come straight through the housing section 42 and impinge directly on the top of the swirl section 106 of the rotor to thereby keep the bucket means 105 thereon clean.

Referring to FIGURE 6, it is seen that the variation of the distribution head structure there shown resides in the arrangement and number of orifices for the controlled distribution of the foam ingredients. There is shown a separate valve controlled orifice 152 for the toluene di-isocyanate, an orifice 153 for the resin, and another orifice 154 for the catalyst and water mix. These valves are identical to those shown in FIGURE 2. The solvent passage to the baffle in this instance is 156, the straight through solvent flow line is 158, and an air blast jet is 160 which jet is used to further force the solvent against the rotor structure and thereby facilitate removal of the partially cured foam residue which exists in the rotor and distribution head structures.

In the variation of FIGURE 7 the catalyst is provided through passage 162, the water through passage 164, the resin through passage 166, and the toluene di-isocyanate through another passage 168. The solvent is provided through passages 170, 172, and air through line 174 in the manner aforementioned in the device of FIGURE 6.

Referring to FIGURE 9, the distribution head consists of two separate valving sections 176 and 178, each being set at an angle of approximately 15° to the vertical. The structure of the two valving elements may be identically alike in most respects and are described using 178 as an example.

Section 178 consists of a distribution head 180 which provides a chamber means 182 having a valve seat 184 and containing an upper valve housing 186. This upper valve housing has a valve seat 188 and a bypass or outlet port 190 therein. An inlet port 192 in section 180 allows pre-polymer (resin-di-isocyanate) to flow into the chamber 182. A valve shaft 194 is slidably mounted in section 186 by means of lower bearing 196 and an upper bearing 198. Attached to the lower portion of this shaft is a valve member 200 which seats at one side on the exhaust seat 184 and on the top side on the bypass seat 188. The structure of this valve is identical to that of valve 80 of FIGURE 2 and it is noted that the valve member 200 is smaller in diameter than the inside of the chamber 182 and prevents dead heading of the inlet pre-polymer flowing through inlet 192. In order to prevent leakage of pre-polymer past the bearing 196 and seal 204, a chamber 205 is formed in housing section 186 surrounding shaft 194 and contains a plasticizer such as tricresylphosphate which acts as a lubricant for the shaft 194 and also prevents upward movement of the pre-polymer along the shaft into the hydraulic cylinder 210 of the valve actuating element 206 which would impair movement of power piston 208. The hydraulic ports for the cylinder 210 are provided at 212 and 214 and operate in substantially the same double acting manner as the valve actuating structure 62 of FIGURE 2. The valve element 176 which provides catalysts and water to the foam charge may be substantially the same structure as element 178 with the exception that the water-catalyst system inlet and by-pass orifices do not have to be as large as the pre-polymer orifices 190 and 192, and also the exhaust orifice 191 of the catalyst valve does not have to be as large as the resin outlet 216.

The hydraulic fluid inlet and exhaust ports of hydraulic cylinders 50 and 52, and also of valves 176 and 178 are adapted for connection to a source of fluid pressure for actuating the pistons therein which control the foam component flow. The flow of fluid to each of these power cylinders may be controlled by any conventional cycling device which can accurately control the fluid flow to the cylinders to thereby accurately actuate the foam component flow valves and regulate the flow of the foam components through the by-pass and exhaust ports in the distribution heads 12 and 180. This cycling device may consist of electrically timed and actuated fluid flow control valves or mechanical cam timed and actuated flow control valves. The foam components may be supplied to the heads in excess by constant delivery pumps and the excess is then returned to the inlet of the pumps or a sump from which the pumps draw the components.

We claim:

1. In a foam-producing apparatus having a mixing unit including a casing and means to supply foam ingredients to said unit, a rotor rotatably mounted in said casing for mixing said ingredients together, said rotor having a cylindrical mixing surface comprising a plurality of diamond-shaped projections, said projections being defined by a first plurality of unidirectional spiral grooves and an intersecting second plurality of unidirectional spiral grooves of opposite hand from said first-mentioned grooves, each of said projections having ingredient-diverting side surfaces thereon, defining a substantially V-shaped leading edge of the projections for separating the stream of said foam ingredients into an upward component and a downward component, said downward component being the greater, pumping means on the feed end of said rotor for imparting a downward and outward thrust to said ingredients comprising a plurality of spirally directed grooves and projections emanating from the central portion of said rotor and extending downwardly and outwardly therefrom and camming means on said rotor outwardly of said pumping means for exerting a downward thrust to the foam ingredients comprising a plurality of spirally directed projections, whose spiral is in substantially the same general direction as that of the projections of said pumping means, said diamond-shaped projections being in substantial running clearance relationship with said casing whereby flow of the fluid components is through and substantially confined to said spiral grooves defining the same.

2. In a mixing device for mixing fluid components for producing reaction products and which device includes a casing and a mixing rotor closely surrounded by said casing, inlet means for the fluid component adjacent the top end of the casing and a discharge outlet for the mixed components adjacent the bottom of said casing, the improvement which comprises a mixing rotor of circular section, having a plurality of grooves extending in adjacent helices over the peripheral surface thereof between the ends of said rotor and defining a plurality of adjacent helically extending rib-like projections, the portions of said helical projections between the lower end of said rotor and a point short of the upper end thereof having spaced transverse grooves, said transverse grooves combining with said first-mentioned grooves to substantially define adjacent helically extending grooves of opposite hand to said first-mentioned grooves crossing said first-mentioned grooves and dividing the said portions of said projections into a plurality of diamond-shaped sections and said projections being in substantially running clearance relationship with said casing whereby flow of fluid components is through and substantially confined to said helical grooves.

3. A mixing device for mixing fluid components for producing reaction products comprising a rotatable mixing rotor of generally cylindrical shape, a casing closely surrounding said rotor and providing inlet means for said fluid components in the upper portion thereof and a discharge outlet in the bottom portion thereof, a plurality of grooves extending in adjacent helices over the peripheral surface of said rotor between the ends thereof and defining a plurality of elongated adjacent helically extending rib-like projections, said helically extending projections over a substantial portion of the length thereof comprising a plurality of spaced apart substantially diamond-shaped sections, said sections combining with portions of said first-mentioned grooves to define additional adjacent helically extending grooves of opposite hand to said first-mentioned grooves and crossing said first-mentioned grooves, said projections being in substantially running clearance relationship with said casing whereby flow of said fluid components is through and substantially confined to said helical grooves.

4. A mixing device for mixing fluid components for producing reaction products comprising a rotatable mixing rotor of generally cylindrical shape, a casing closely surrounding said rotor and providing inlet means for said fluid components in the upper portion thereof and a discharge outlet in the bottom portion thereof, a plurality of grooves extending in adjacent helices of the same hand over the peripheral surface of said rotor between the ends thereof and defining a plurality of adjacent helically extending elongated rib-like projections, said projections over a substantial portion of the length thereof comprising a plurality of substantially diamond-shaped sections spaced by short grooves whose length is the width of the projections, the diamond-shaped sections of adjacent helically extending rib-like projections being in juxtaposition and a plurality thereof together defining a helix of opposite hand to that of said helically extending projections of which these diamond-shaped sections are a part, and said short grooves combining with portions of said first-mentioned grooves in defining additional adjacent helically extending grooves of opposite hand to said first-mentioned grooves, said rib-like projections being in substantial running clearance relationship with said casing whereby flow of said fluid components is through and substantially confined to said helically extending grooves, said helices defined by said rib-like projections having a relatively fast lead and said helices defined by said juxtapositioned diamond-shaped sections of the adjacent rib-like projections having a lead substantially slower than those of said rib-like projections.

5. A mixing device as claimed in claim 3 wherein the upper end area of said rotor has a cylindrical wall portion defining a depression therein, wherein the portions of said elongated rib-like projections on the portion of the peripheral surface of the rotor confronting said depressions are continuous and substantially free of said diamond-shaped sections and wherein said helical grooves defining said rib-like projections extend through the wall portion defining said depression and open into said depression so as to define a skeletonized helical rib structure in the upper end area of said rotor.

6. A mixing device as claimed in claim 5 wherein the base of said depression presents a plurality of further rib-like projections extending outwardly from adjacent the axis of said rotor, said projections determining fluid component grooves for connection with said helical grooves extending through said wall portion.

7. A mixing device as claimed in claim 6 wherein said further projections in the base of said depression are shaped to partially overlie the said feed grooves which they determine.

8. A mixing device as claimed in claim 3, wherein said casing has a substantially smooth inner wall surrounding said rotor.

9. A mixing device as in claim 3, wherein there is a separate gas passage in said rotor independent of said grooves having its outlet at the discharge end of said device for controlling the spray pattern of the rotor.

10. A mixing device as claimed in claim 3 wherein said diamond-shaped sections have intersecting surface portions for separating the stream of fluid material into an upwardly directed portion and a downwardly directed portion, the said downwardly directed portion having the greater force component acting thereon.

11. A mixing device as claimed in claim 3 having operably connected therewith a distribution means for directing fluid component to said device, said distribution means having wall means defining a chamber for receiving fluid component, an inlet port opening into said chamber and through which fluid component is delivered to said chamber, an exhaust port opening into said chamber and connecting with said mixing means and through which port fluid component entering said inlet port may flow to said mixing means, said exhaust port including a valve seat, a by-pass port opening into said chamber and through which port fluid component entering said inlet port may pass and be directed away from said distribution means, said by-pass port including a valve seat, said inlet port being located intermediate said exhaust and by-pass ports, valve means operable upon said exhaust and by-pass ports to effect a restriction of each between a substantially wide open condition and a fully closed condition, said valve means including portions engageable respectively with said valve seats for closing said exhaust and by-pass ports respectively to the flow of fluid component, and operating means for said valve means operable to position said valve means to render said exhaust port substantially fully open when said by-pass port is fully closed and to render said by-pass port substantially fully open when said exhaust port is fully closed, said valve means being in spaced relationship to said inlet port and said wall means of said chamber intermediate said valve seats during all positioning of said valve means between said seats whereby to define a space between said valve means and chamber wall means into which said fluid component may flow and be distributed to at least one of said exhaust and by-pass ports during all operations of said valve means.

12. A mixing device as claimed in claim 11 wherein said chamber and valve means are of circular section, and said valve seats and portions of said valve means engageable therewith are of truncated conical form and wherein said valve means has a cross sectional area at all sections less than that of said chamber between said seats.

13. A mixing device as claimed in claim 12 wherein the portion of said valve means engageable with said exhaust port valve seat includes a projecting cylindrical scavenger portion movable into and substantially fitting said exhaust port for removing adhered fluid component from said exhaust port.

References Cited in the file of this patent

UNITED STATES PATENTS

| | | |
|---|---|---|
| 2,768,405 | Mineah | Oct. 30, 1956 |
| 2,814,827 | Snow et al. | Dec. 3, 1957 |
| 2,885,268 | Breer et al. | May 5, 1959 |
| 2,958,516 | Wall et al. | Nov. 1, 1960 |
| 2,970,817 | Gurley | Feb. 7, 1961 |